March 28, 1961 P. W. FITT 2,977,078
QUICK DISCONNECT COUPLINGS
Filed April 9, 1957 4 Sheets-Sheet 1

INVENTOR
Peter William Fitt
BY
Larson and Taylor

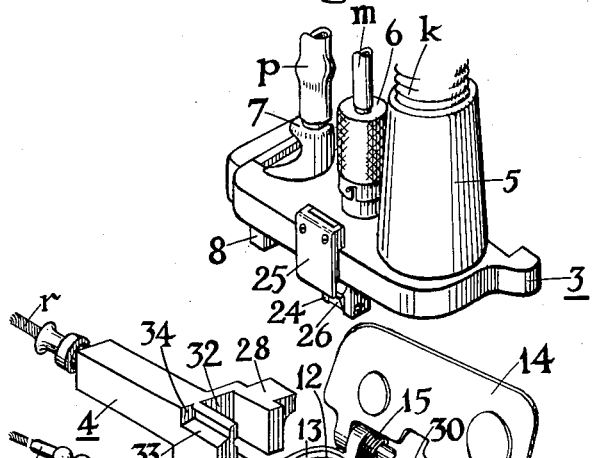

March 28, 1961 P. W. FITT 2,977,078
QUICK DISCONNECT COUPLINGS
Filed April 9, 1957 4 Sheets-Sheet 3
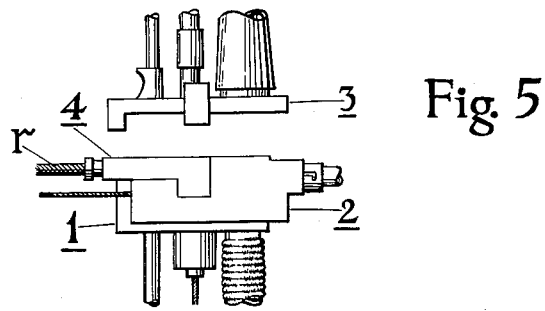
Fig. 5
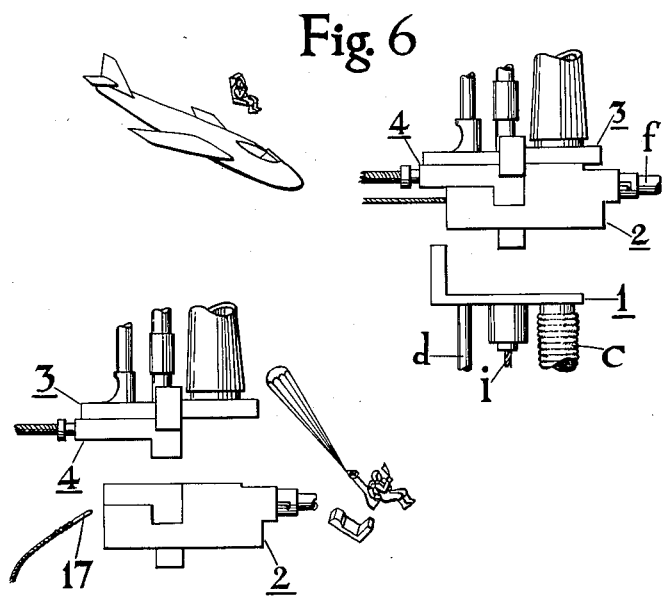
Fig. 6
Fig. 7
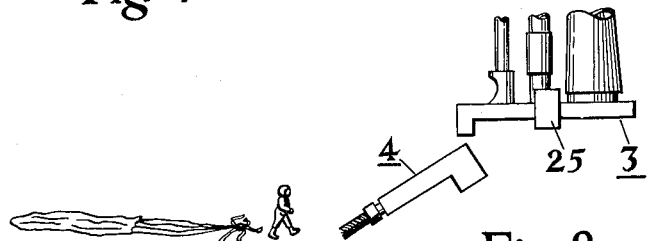
Fig. 8
INVENTOR
Peter William Fitt
BY
Lawson and Taylor

United States Patent Office 2,977,078
Patented Mar. 28, 1961

2,977,078

QUICK DISCONNECT COUPLINGS

Peter William Fitt, West Hendford, Yeovil, England, assignor to Normalair Limited, Yeovil, England Filed Apr. 9, 1957, Ser. No. 651,763

Claims priority, application Great Britain Apr. 12, 1956

2 Claims. (Cl. 244—122)

This invention relates to couplings of the quick disconnect type, and is intended particularly though not exclusively to be embodied in a readily detachable assembly of a crew members' oxygen breathing apparatus for use in high speed aircraft using ejector seats.

One object of the invention is to provide a system, the function of which is primarily to give temporary protection to individual aircrew-members after abandoning the aircraft. Should ejection be necessary above 40,000 ft., it will give reasonable protection for descent while "riding the seat down" to a lower altitude before separation. The seats with which the equipment may be used provide that at 10,000 ft., the seat occupant will be thrown automatically from the seat and the parachute deployed, but he will be able to separate at a higher altitude than this if he so wishes.

A feature of this system is the combining of the microphone-telephone leads referred to hereinafter as mic-tel leads, with the "breathing" oxygen supply pipe. An additional electrical lead is also incorporated to allow opening visors of certain headpieces to be closed automatically should the cabin altitude exceed 40,000 ft.

The invention consists in a quick release coupling, allowing all breathing and suit connections to be made at convenient points within the aircraft in a single "plug-in" operation. A spring loaded duct cover acts as a seal when the coupling is not in use, thus preventing undue wastage of oxygen from an unoccupied crew position.

The invention also consists in a quick release coupling as described comprising a plurality of readily detachable units socketed together to provide communication therethrough and has means provided for progressively detaching each unit from the coupling in predetermined sequence.

In order that the invention may be better understood and readily carried into effect certain embodiments thereof will now be described by way of example with reference to Figures 1–8 of the drawings accompanying the specification:

Fig. 2 shows a view of a part of the invention which may be attached to an aircraft crew member.

Fig. 3 shows a view of a further part of the invention which may be attached to an aircraft ejection seat.

Fig. 4 shows a view of a further part of the invention which may be attached to an aircraft and ejection seat therein.

Figs. 5, 6, 7 and 8 show diagrammatically the sequence of coupling and coupling breakages when (1) Entering the aircraft, or at a convenient point within,
(2) Ejection from the aircraft,
(3) Release from the ejection seat, and
(4) Release of harness on landing respectively.

Figure 1:
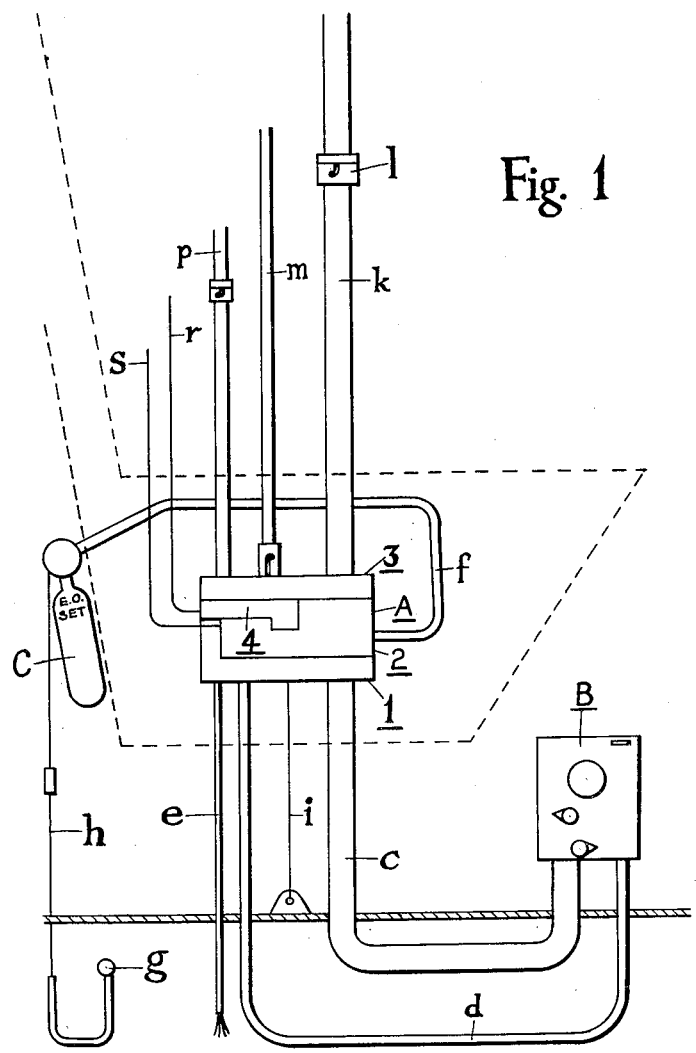
Fig. 1 shows the invention installed on an aircraft ejection seat.

In carrying the invention into effect according to one convenient form by way of example as illustrated generally in Fig. 1, accompanying the specification, I provide a quick-release coupling A with its lower portion 1 slidably attached to an ejector seat (shown in dotted lines). An oxygen demand pressure regulator B is in communication with coupling A by way of a flexible breathing supply duct c and a pressure suit supply duct d. An electrical supply lead e is provided for the crew man's mic-tel and visor services. An emergency oxygen set C is in communication with the centre breakaway portion 2 of the coupling A by way of a duct f and is provided with a manual release g connected to the set C by way of a cable h. A floor lanyard i anchors the lower portion 1 of the coupling A to the aircraft structure to retain the lower portion 1 of the coupling upon ejection of the seat. On section 3 of coupling A is located a flexible breathing supply duct k in which is incorporated the mic-tel leads, a duct m to the crew-member's crutch bladder, a duct p to pressure suit inflation and a Bowden cable r from section 4 of the coupling leading to a normal type of parachute quick release harness box.

Referring to Figs. 2, 3, 4 and 5 accompanying the specification which together illustrate an "exploded" view of the coupling details, Fig. 2 represents the emergency breakaway coupling attached to the crew member, and comprises a base 3, a coupling 5 for breathing tube k, a bayonet joint 6 for crutch bladder tube m, a coupling 7 for pressure suit inflation tube p and an electric socket 8. Also attached to base 3 is a latch 24 comprising a push-button catch 25 and a plug 26.

Figure 9:
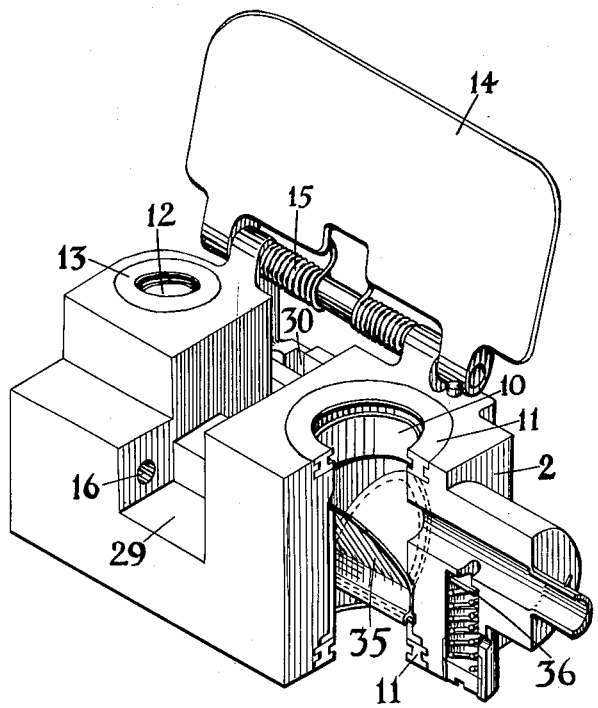
Fig. 9 shows a further view of part of the invention shown in Fig. 3.

Fig. 3 and Fig. 9 show the seat/aircraft coupling comprising a body 2 having located on one side a bayonet coupling 9 to accommodate duct f which is the breathing supply from the emergency oxygen set C (Fig. 1). The other side of the body 2 is formed to accommodate the coupling 4 portions 27, 28 of the latter socketing in recesses 29, 30 respectively of body 2. Vertically through one end of body 2 adjacent to and in communication with the breathing supply coupling 9, is formed a duct having sealing washers 11 inserted at each end (the upper one only of which is shown), to match up with and to form a continuous passage for input and output breathing tubes c and k. Vertically through the opposite side of body 2 is formed a duct 12 having sealing washers 13 inserted at each end (the upper one only of which is shown), to match up with the suit inflation tube p. Coupling 4 is locked in socketed relationship with body 2 by release pin 17 connected by cable 5 to the seat, and inserted through holes 16 and 31 in body 2 and coupling 4 respectively.

With coupling 4 socketed in body 2, the coupling of Fig. 2 may be socketed into the combined member 2 and 4, the plug 26 attached to base 3 being accommodated by recess 32 in coupling 4, and the catch 25 similarly by recess 33. A dust cover 14 is urged to a closed position by a spring 15 and the dust cover automatically closes when base 3 is withdrawn from coupling 4 and body 2.

Fig. 4 represents the portion of the seat coupling attached to the aircraft floor and comprises a base plate 1 having located at one end a coupling 18 to accommodate the breathing supply tube c and formed to a taper 19 to form a gas tight joint when inserted into the rubber sealing washer 11 in body 2 (Fig. 9). At the other end of base plate 1 is located a coupling 20 to accommodate the pressure suit supply tube d and formed to a taper 21 to plug into lower washer 13 (not shown). Attached to the end of base plate 1 is an electric plug 22 for the mic-tel and visor supply lead e. Base plate 1 is also formed with a sliding socket 23 for fitting on to the ejector seat.

In normal use, on entering the aircraft the crew member sits in his seat and plugs the suit portion of the connector 3 into the mating portion 2. The seats normally provided for such aircraft have the crew members' parachute attached to the seat by suitable attachments, the crew member securing himself both to the seat and to his parachute by a harness provided around his body. A locking mechanism generally referred to as a harness box is provided to secure the straps of the harness together. The link 4 and $r$ between the parachute harness box and the coupling ensures that once the harness box is locked separation of the suit portion 3 of the conector cannot take place from the seat portion 2 and mic-tel communication cannot commence until a satisfactory breathing connection is made.

During the whole of the time that the harness box is locked, the suit portion 3 of the connector is rigidly held into the seat part 2 of the connector. It is impossible for the crew member to cause accidental separation due to energetic movement in the seat.

When normally leaving the aircraft, the crew member unlocks his harness box and releases himself from the harness around his body, the action of unlocking the box releases the suit portion 3 of the connector so that it can be pulled free from the mating portion by normal pulling action, either manually or as a result of the crew member standing up. There is therefore no necessity for him to make any conscious effort to release himself beyond releasing his harness.

In normal flight, should the main oxygen supply fail, the emergency oxygen set C, which forms part of the seat, is brought into operation by pulling the manual release $g$.

If ejection from the aircraft takes place, the emergency oxygen set C, is automatically brought into operation by a lanyard release $h$. At the same time the lower portion 1 of the coupling separates from the seat portion 2 as a result of the pull imposed by lanyard $i$ attached to the floor.

During descent on the seat the crew member receives a continuous flow of oxygen from bottle C, excess being vented through a relief valve 35 (Fig. 9) and "bottoming" being prevented by an inward relief valve (not shown) in the breathing inlet of the coupling. A non-return valve 35 (Fig. 9) within seat portion 2 prevents oxygen escaping to the atmosphere. The high pressure emergency oxygen may be supplied to the crew member at a breathable pressure by any suitable means such as the provision of a reducing valve or a demand regulator in the oxygen supply line.

Upon descending to a predetermined altitude, the harness is released from the seat attachment points either manually or automatically causing the crew member to separate from the seat (Fig. 7) leaving the emergency oxygen set C with the seat. Portion 1 of the coupling separates from the locking portion 3 and 4 by the withdrawal of release pin 17 through holes 16 and 31 in body 2 and coupling 4 respectively by way of cables, allowing locking portion 3 and 4, which is attached to the harness by cable $r$, to travel with the crew member.

On reaching the ground (Fig. 8) the crew member unlocks his harness box and this permits the locking portion 4 of the coupling to separate from the portion 3 attached to his clothing.

If the crew member has to make a "bale-out" without the ejector seat, it will be necessary for him to leave his emergency oxygen supply behind in the same way as when he separates from his seat after ejection, so that the coupling will part in the correct way when he manually releases his harness from the seat attachment points.

It will be apparent to those skilled in the art that the invention is capable of further application other than may be installed within the aircraft permitting crew members to move to various positions obtaining the oxygen necessary for breathing and providing telephone intercommunication.

These coupling points may take the form of portions 1, 2 and 4 manufactured integrally, with portion 3 adapted to "plug-in" to these supply points. A simple spring loaded latching mechanism may be provided to secure the two portions in socketed relationship, together with a suitable hand release to disengage the latching mechanism when it is required to remove portion 3 from the supply point.

Yet a further application of the invention may be to provide manual release of portion 3 from portions 4, 2 and 1 of the coupling hereinbefore described and illustrated in Figures 1 to 8 accompanying the specification. Normally this portion 3 may not be separated from portions 4, 2 and 1 once the parachute harness has been locked, because of a locking pin (not shown) operated by cable $r$ securing portions 3 and 4 together. A latching mechanism similar to that described in the previous paragraph may be provided with the disengaging mechanism so arranged as to move the securing latch in the latching mechanism away from this pin so allowing portion 3 to be withdrawn from remaining portions 4, 2 and 1. The advantage of this arrangement would be to allow a crew member to leave his ejection seat together with his parachute merely by removing the attachment points between seat and parachute harness and operating the latch disengaging mechanism as described.

I claim as my invention:

1. A quick release coupling for breathing and electrical services of an aircraft's crew member having an ejection seat and comprising: a supply coupling anchored to the aircraft's structure and detachably engaging a complementary face of an intermediate coupling member attached to the ejector seat and provided with fluid and electrical conducting means therethrough to a second complementary face, a self contained supply of pressurised breathable gas on the seat, means operable to release said gas upon ejection of the seat, flow conducting means between the self contained supply of breathable gas and the fluid conducting means of the intermediate coupling member, and a crew member's receiving coupling detachably engaging the second complementary face of the intermediate coupling member, releasable when said crew member leaves said ejection seat after ejection.

2. A quick release coupling for breathing and electrical services of an aircraft's crew member having an ejection seat and comprising: a supply coupling anchored to the aircraft's structure and detachably engaging a complementary face of an intermediate coupling member attached to the ejector seat and provided with non-return fluid conducting means and electrical conductors therein and therethrough to a second complementary face, a self contained supply of pressurised breathable gas on the seat, means operable to release said gas upon ejection of the seat, flow conducting means between the self contained supply of breathable gas and the fluid conducting means of the intermediate coupling member, and a crew member's receiving coupling detachably engaging the second complementary face of the intermediate coupling member, releasable when said crew member leaves said ejection seat after ejection.

References Cited in the file of this patent

UNITED STATES PATENTS

| 803,648 | Williams | Nov. 7, 1905 |
| 2,302,707 | Mejean | Nov. 24, 1942 |
| 2,494,207 | Sabbia | Jan. 10, 1950 |
| 2,510,125 | Meakin | June 6, 1950 |
| 2,806,667 | Kugler | Sept. 17, 1957 |
| 2,813,690 | Holmes | Nov. 19, 1957 |